(12) United States Patent
Zou et al.

(10) Patent No.: US 11,526,742 B2
(45) Date of Patent: Dec. 13, 2022

(54) METHOD AND SYSTEM FOR INTELLIGENT DECISION-MAKING PHOTONIC SIGNAL PROCESSING

(71) Applicant: Shanghai Jiao Tong University, Shanghai (CN)

(72) Inventors: Weiwen Zou, Shanghai (CN); Lei Yu, Shanghai (CN); Shaofu Xu, Shanghai (CN); Bowen Ma, Shanghai (CN); Jianping Chen, Shanghai (CN)

(73) Assignee: Shanghai Jiao Tong University, Shanghai (CN)

(*) Notice: Subject to any disclaimer, the term of this patent is extended or adjusted under 35 U.S.C. 154(b) by 1107 days.

(21) Appl. No.: 16/132,259

(22) Filed: Sep. 14, 2018

(65) Prior Publication Data
US 2019/0318236 A1    Oct. 17, 2019

(30) Foreign Application Priority Data
Apr. 14, 2018 (CN) .......................... 201810334227.8

(51) Int. Cl.
*G06N 3/067* (2006.01)
*G06E 3/00* (2006.01)
*G06N 3/04* (2006.01)
*G06N 3/08* (2006.01)
*H04B 10/70* (2013.01)

(52) U.S. Cl.
CPC .......... *G06N 3/0675* (2013.01); *G06E 3/005* (2013.01); *G06N 3/04* (2013.01); *G06N 3/08* (2013.01); *H04B 10/70* (2013.01)

(58) Field of Classification Search
CPC .......... G06N 3/04; G06N 3/0675; G06N 3/08; H04B 10/70; G06E 3/00; G06E 3/005
See application file for complete search history.

(56) References Cited

U.S. PATENT DOCUMENTS

| 10,268,232 | B2 * | 4/2019 | Harris | G02F 1/225 |
| 2017/0351293 | A1 * | 12/2017 | Carolan | G06E 3/005 |
| 2019/0080167 | A1 * | 3/2019 | Zhu | G06K 9/00624 |

OTHER PUBLICATIONS

Brunner, Daniel, Stephan Reitzenstein, and Ingo Fischer. "All-optical neuromorphic computing in optical networks of semiconductor lasers." 2016 IEEE International Conference on Rebooting Computing (ICRC). IEEE, 2016. (Year: 2016).*
C. Sun, et al., "Single-chip microprocessor that communicates directly using light," Nature, 528, 534-544, 2015.
Yichen Shen et al., "Deep learning with coherent nanophotonic circuits," Nat. photon. 11 441-447, 2017.

* cited by examiner

*Primary Examiner* — Benjamin P Geib
(74) *Attorney, Agent, or Firm* — Mei & Mark LLP; Manni Li

(57) ABSTRACT

Method and system for intelligent decision-making photonic signal processing, where the system comprises a multi-functional input unit, an electro-optical conversion module, a signal processing module, a photoelectric conversion module, a multi-functional output unit, and an artificial intelligence chip. The invention combines the advantages of photonic high-speed, wide-band, and electronic flexibility, combined with heterogeneous photoelectron hybrid integration, packaging and other processes, along with deep learning algorithm, is an intelligent electronic information system that may simultaneously realize digital and analog signal processing.

5 Claims, 4 Drawing Sheets

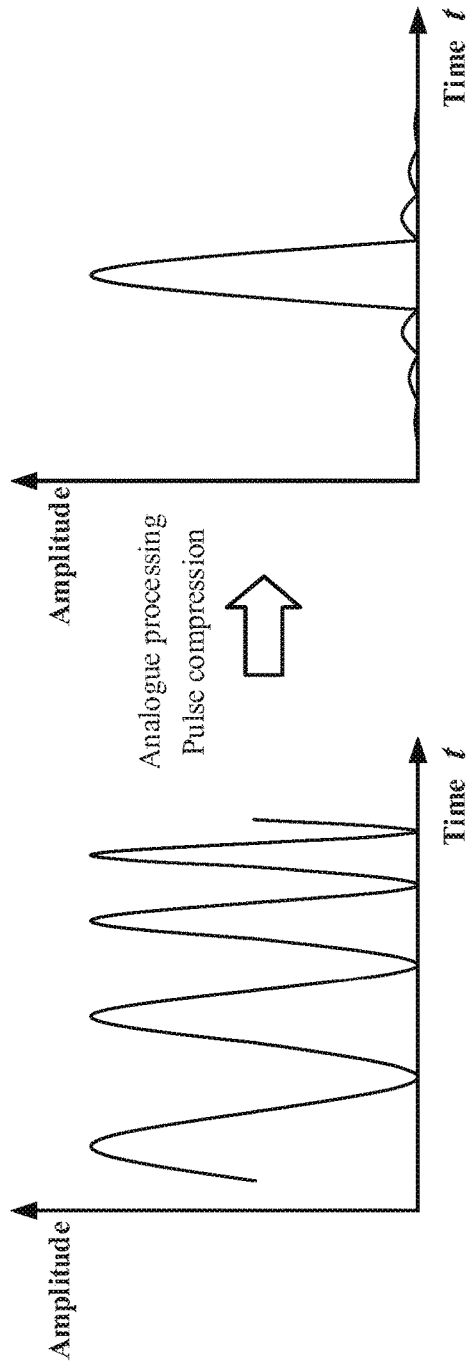
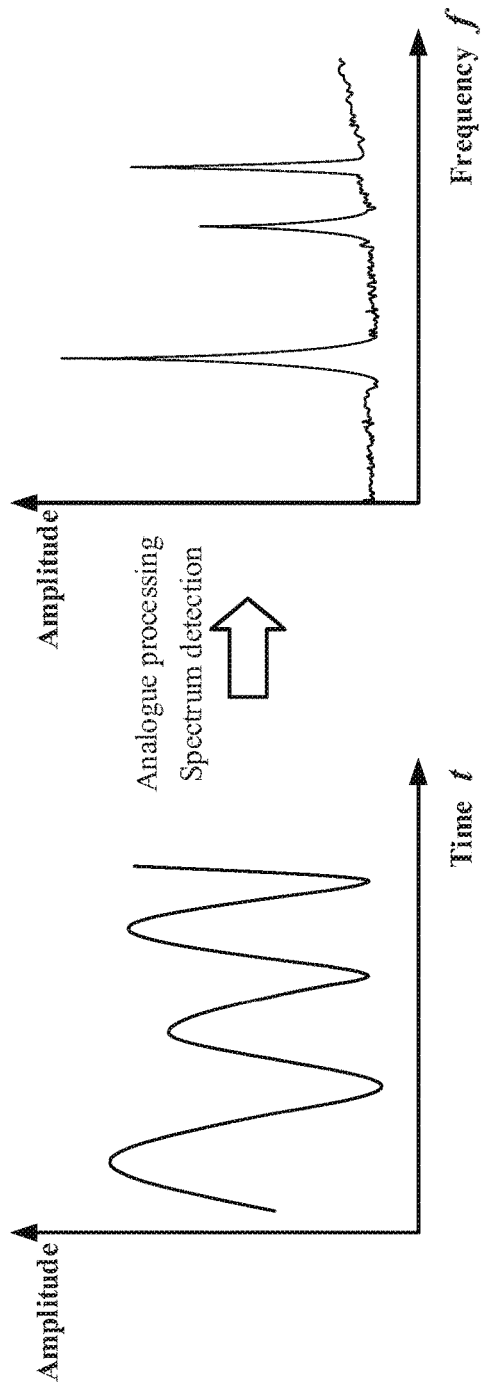
FIG. 2A
FIG. 2B

METHOD AND SYSTEM FOR INTELLIGENT DECISION-MAKING PHOTONIC SIGNAL PROCESSING

CROSS-REFERENCE TO RELATED APPLICATION

The subject application claims priority on Chinese application no. 201810334227.8 filed on Apr. 14, 2018. The contents and subject matter of the Chinese priority application are incorporated herein by reference.

FIELD OF INVENTION

The present invention relates to optical signals, particularly, an intelligent decision-making photonic signal processing system and method.

BACKGROUND ART

Future electronic information systems such as radar, electronic countermeasures, and communications are facing challenges such as complex environments, strong confrontation, real-time responses, incomplete information, and the uncertainty of the signal. It is the inevitable trend for signal processing system to develop wide frequency band, frequency agility, ultra-wideband array, multi-function integration, and intelligent adaptability to circumstances. The efficient and real-time intelligent processing of high-frequency, ultra-wideband signals is the only way for electronic information systems towards next-generation performance upgrades. However, because of restrictions of the operating speed and bandwidth of electronic devices, the performance improvement of signal processing systems that are based on traditional electronic technologies is encountering insurmountable obstacles.

Photonic technology may break the "electronic bottleneck" and is an important breakthrough for achieving ultra wide band, ultra high speed signal, and high efficiency. At the same time, with the photonic integration technology unceasing development, the use of mature microelectronics CMOS process to directly prepare, grow on SOI, bond with InP and other heterogeneous materials, etc., to produce microwave optoelectronic integrated components, is an important guarantee for realizing miniaturization of the photonic signal processing system. As the consequence, the microwave technology with elaborate processing capacity of the signal is organically combined with the photonic technology with the high speed wideband processing capacity for the signal on the chip scale, which may effectively solve the problems associated with the traditional microwave radio frequency technology and provide an extraordinary solution for improving performance of electronic information systems such as radar, electronic countermeasures, and communication.

At present, intelligent photonic signal processing has become a research hotspot for developed countries to develop a new generation of electronic information systems. According to reports, laboratories in U.S. have begun to study human brain-like supercomputing technology, aiming to build ultra-low power consumption brain-like computing systems capable of real-time processing of unstructured information and learning capabilities, thereby breaking through the limitation of von Neumann architecture on computing speed and power consumption and becoming the "brain" of artificial intelligence era. Meanwhile, the relevant American team has announced that it would launch the first compact intelligent algorithm for embedded weapon systems and sensor processors in 2017. Under the support of the computing power, machine learning and data visualization will be updated in real time to create a continuous learning environment. DARPA announced the establishment of a new project, "Radio Frequency Machine Learning System (RFMLS)," hoping to help decision makers obtain useful information from vast amounts of information, further aid decision-making, and achieve intelligent decision-making. The company is also currently developing a joint university microelectronics program to improve overall processing capabilities. Researchers at MIT and the University of California, Berkeley, have applied optical interconnects to chips of the "electron-photonics" system to achieve a processing speed 50 times faster than current processors (C. Sun, et al., "Single-chip microprocessor that communicates directly using light," Nature, 528, 534-538, 2015). However, the technology only realizes the integration of electronic components and optoelectronic components, and does not fully satisfy the future demand for intelligent signal processing systems. On the other hand, the deep learning technology based on photonic technology is constantly being developed as well (Yichen Shen et al., "Deep learning with coherent nanophotonic circuits," Nat. photon. 11 441-447, 2017). The technology avoids the neural network architecture of the digital domain, directly implements neural networks and therefore has greater development advantages.

Intelligent photonics technology is a new technology based on photonic technology, electronic technology, material technology, and artificial intelligence. The technology takes advantages of parallel processing of light, large bandwidth, low loss, and long-distance transmission, combined with electrical signal processing, deep learning algorithms, and artificial intelligence, to form an intelligent photonic processing system. With the continuous development of demands of electronic information systems for signal processing, study of optoelectronic technology-based single-function systems and reconfigurable systems may no longer meet the requirements of intelligent decision-making in future electronic information systems. Therefore, research on intelligent photonic signal processing has been conducted. The development of photonic signal processing methods for realizing intelligent decision-making is of great significance for improving the performance of electronic information systems.

SUMMARY OF THE INVENTION

The object of the present invention is to provide an intelligent decision-making photonic signal processing system and method aiming at the defect of the current technology. The system organically combines the advantages of photonic high-speed, wide-band, and electronic flexibility, combined with heterogeneous photoelectron hybrid integration, packaging, and other processes, along with deep learning, is an intelligent electronic information system that may simultaneously realize digital and analog signal processing.

The technical solution of present invention is as follows:

An intelligent decision-making photonic signal processing system, comprising a multi-functional input unit, an electro-optical conversion module, light source arrays, a signal processing module, a photoelectric conversion module, a multi-functional output unit, and an artificial intelligence chip. The signal processing module comprises multiple analog signal processing units and multiple digital signal processing units. The output port of the multi-functional input unit is connected to the first input port of the electro-optical conversion module. The output port of the light source arrays is connected to the second input port of the electro-optical conversion module. The first output port of electro-optical conversion module is connected to the first input port of the photoelectric conversion module through analog signal processing units. The second output port of electro-optical conversion module is connected to the second input port of the photoelectric conversion module through digital signal processing units. The first output port of photoelectric conversion module is connected to the input port of the multi-functional output unit. The artificial intelligence chip is respectively connected to the electro-optical conversion module, light source arrays, multiple analog signal processing units and multiple digital signal processing units of the signal processing module, the photoelectric conversion module and the multi-functional output unit.

In the present invention, analog signal processing units are a collection of analog neural networks, signal filtering, pulse compression, and spectrum detection module. Each module may realize signal interaction via optical interconnects.

In the present invention, digital signal processing units are a collection of digital neural networks, analog-digital conversion, and digital communication module. Each module may realize signal interaction via optical interconnects.

In the present invention, the electro-optical conversion module is a collection of electro-optical modulators. Each electro-optical modulator is respectively connected to one light output of light source arrays and one electrical signal of the multi-function output unit, and outputs one modulated light signal.

In the present invention, the multi-functional input unit is various radio frequency receiving antennas or digital communication receivers.

In the present invention, the multi-functional output unit is used to output processed signals, which include radio frequency signals, digital signals, and digital images.

In the present invention, the artificial intelligence chip is a tensor processing unit (TPU), a graphics processor unit (GPU), a photonic analog chip, or a digital chip.

In the present invention, the intelligent decision-making photonic signal processing method employing the intelligent decision-making photonic signal processing system includes following steps:

(1) The multi-function input unit is used to receive multi-functional radio frequency signals, and modulate radio frequency signals to a continuous or pulsed optical carrier generated by light source arrays via the electro-optical conversion module, thereby completing the conversion from radio frequency signals to optical domain signals;

(2) Radio frequency signals modulated into the optical domain enter signal processing units, and is processed by analog signal processing units or digital signal processing units after being determined via signal according to different functional requirements;

(3) The processed signals are converted into electrical signals by the photoelectric conversion module. The electrical signals are split into two parts; one is output through the multi-function output unit, and the other is input into the artificial intelligence chip to process, determine and make decisions on signals. Moreover, signals processed by signal processing units may also directly enter the artificial intelligence chip;

(4) The signals accessed to the artificial intelligence chip are used to train deep learning networks of the chip. At the same time, the artificial intelligence chip forms an intelligent signal processing unit through the constructed deep learning networks. The intelligent signal processing unit controls the electro-optical conversion module, analog signal processing unit, digital signal processing unit, photoelectric conversion module, and multi-function output unit to realize signal receiving and processing. The intelligent signal processing unit performs fast processing, determination and decision on the acquired signals, and simultaneously controls signal transmission and information output.

Based on the above technical features, the present invention is advantageous in that:

1. The present invention realizes digital signal processing and analog signal processing simultaneously based on photonic technology, gives full play to the advantages of high-efficiency and real-time processing of analog signals, further promotes the improvement of digital signal processing capacity, and improves the signal processing performance of the electronic information system.

2. The present invention builds intelligent networks based on deep learning algorithms, and realizes training, fast processing, determination and decision of signals, so as to effectively deal with information acquisition, identification, coordination, and intelligent decision making in complex environment.

3. The present invention is based on heterogeneous photoelectron integrated technology, and carries out chip research of corresponding optoelectronic modules in terms of material selection, structure optimization, process, and packaging, thereby realizing an intelligent photonic processing system with small size and low power consumption.

BRIEF DESCRIPTION OF THE DRAWINGS

FIG. 2A is a schematic drawing showing pulse compression in the analogue signal processing; FIG. 2B is a schematic drawing showing spectrum in the analogue signal processing.

DETAILED DESCRIPTIONS OF THE EMBODIMENTS

In combination with FIGS. and embodiments hereunder provided, the present invention is further expounded. The embodiments implemented based on the technical solution of the present invention provide detailed implementations and procedures, and are not meant to limit the scope of the present invention.

Figure 1:
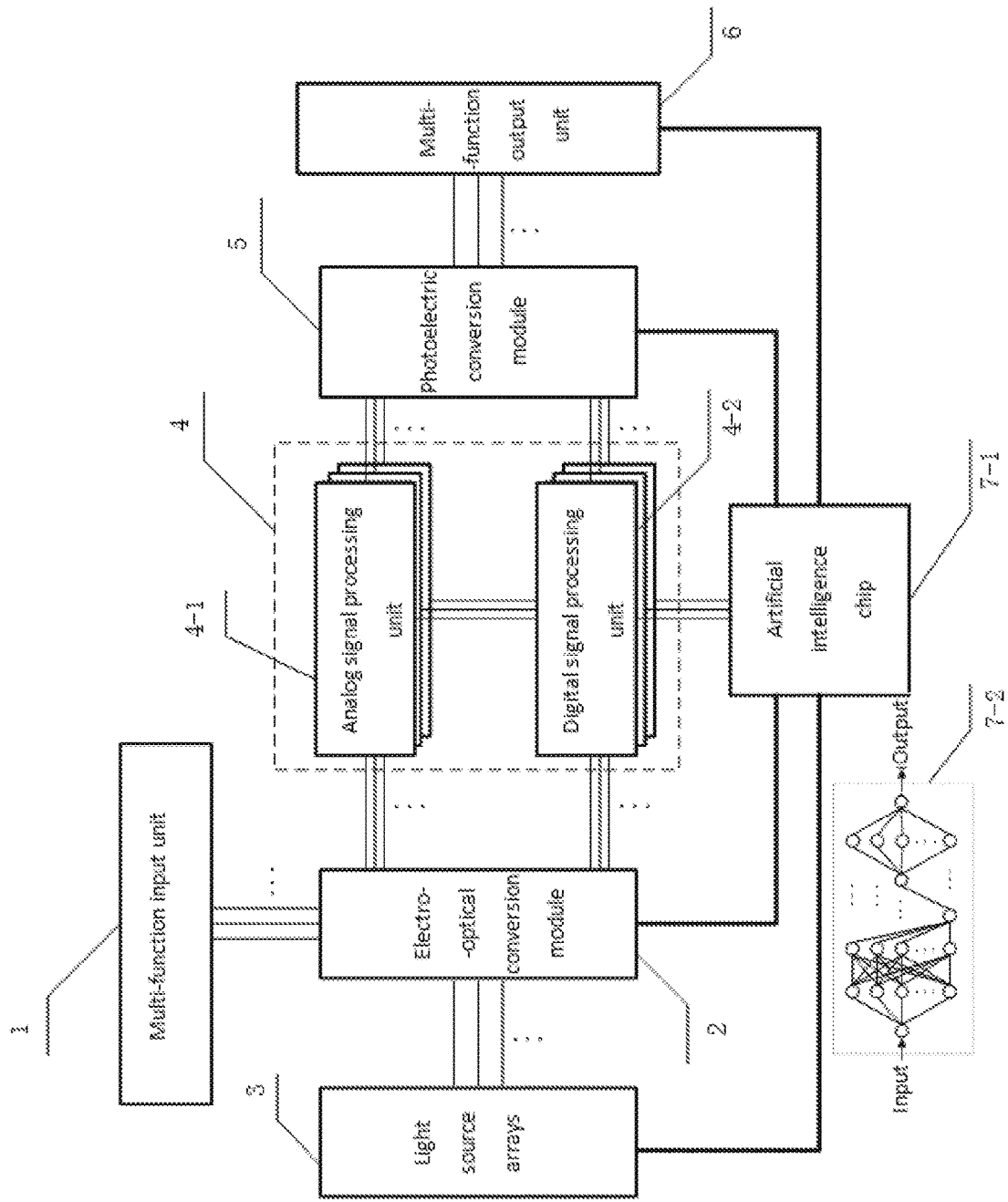
FIG. 1 is a block diagram showing one embodiment of the intelligent decision-making photonic signal processing system of the present invention.

As shown in FIG. 1, the intelligent decision-making photonic signal processing system of the present invention comprises a multi-functional input unit 1, an electro-optical conversion module 2, light source arrays 3, a signal processing module 4, a photoelectric conversion module 5, a multi-functional output unit 6, and an artificial intelligence chip 7-1. The signal processing module 4 comprises multiple analog signal processing units 4-1 and multiple digital signal processing units 4-2. The output port of the multi-functional input unit 1 is connected to the first input port of the electro-optical conversion module 2. The output port of light source arrays 3 is connected to the second input port of the electro-optical conversion module 2. The first output port of electro-optical conversion module 2 is connected to the first input port of the photoelectric conversion module 5 through analog signal processing units 4-1. The second output port of electro-optical conversion module 2 is connected to the second input port of the photoelectric conversion module 5 through digital signal processing units 4-2. The first output port of photoelectric conversion module 5 is connected to the input port of the multi-functional output unit 6. The artificial intelligence chip 7-1 is respectively connected to the electro-optical conversion module 2, light source arrays 3, multiple analog signal processing units 4-1 and multiple digital signal processing units 4-2 of the signal processing module 4, the photoelectric conversion module 5 and the multi-functional output unit 6.

Analog signal processing units are a collection of analog neural networks, signal filtering, pulse compression, and spectrum detection module. Each module may realize signal interaction via optical interconnects.

Digital signal processing units are a collection of digital neural networks, analog-digital conversion, and digital communication module. Each module may realize signal interaction via optical interconnects.

The electro-optical conversion module is a collection of is a collection of electro-optical modulators. Each electro-optical modulator is respectively connected to one light output of light source arrays and one electrical signal of the multi-function output unit, and outputs one modulated light signal.

The multi-functional input unit is various radio frequency receiving antennas or digital communication receivers for receiving multifunctional radio frequency signals.

The multi-functional output unit is used to output processed signals, which include radio frequency signals, digital signals, and digital images.

The artificial intelligence chip is a tensor processing unit (TPU), a graphics processor unit (GPU), a photonic analog chip or a digital chip. The artificial intelligence chip refers to a computing chip with deep learning purpose. One feature of the computing chip is that it may be suitable for quick calculations in deep learning algorithms. Therefore, these chips are all existing products. Further, algorithms for constructing deep learning networks also exist.

The intelligent decision-making photonic signal processing method of the present invention employs the intelligent decision-making photonic signal processing system and includes following steps:

(1) The multi-function input unit 1 is used to receive multi-functional radio frequency signals, and modulate radio frequency signals to a continuous or pulsed optical carrier generated by light source arrays 3 via the electro-optical conversion module 2, thereby completing the conversion from radio frequency signals to optical domain signals;

(2) Radio frequency signals modulated into the optical domain enter signal processing units 4, and is processed by analog signal processing units 4-1 or digital signal processing units 4-2 after being determined via signal according to different functional requirements;

(3) The processed signals are converted into electrical signals by the photoelectric conversion module 5. The electrical signals are split into two parts; one is output through the multi-function output unit 6, and the other is input into the artificial intelligence chip 7-1 to process, determine and make decisions on signals. Moreover, signals processed by signal processing units 4 may also directly enter the artificial intelligence chip 7; and (4) The signals accessed to the artificial intelligence chip 7-1 are used to train deep learning networks of the chip 7-2. At the same time, the artificial intelligence chip 7-1 forms an intelligent signal processing unit through the constructed deep learning networks 7-2. The intelligent signal processing unit controls the electro-optical conversion module 2, analog signal processing unit 4-1, digital signal processing unit 4-2, photoelectric conversion module 5, and multi-function output unit 6 to realize signal receiving and processing. The intelligent signal processing unit performs fast processing, determination and decision on the acquired signals, and simultaneously controls signal transmission and information output.

Figure 2C:
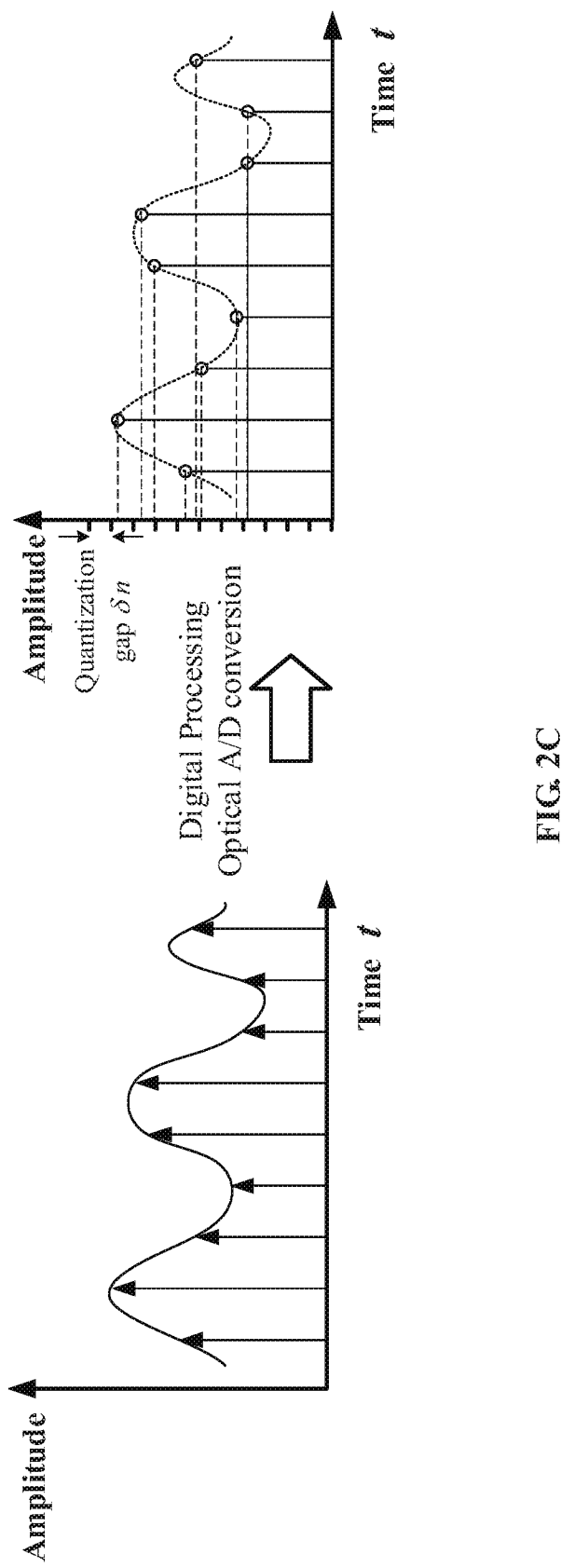
FIG. 2C shows optical analog-digital conversion in the digital signal processing.

The multi-function input unit 1 receives various types of radio frequency signals, and modulates the received radio frequency signals to the light source generated by the light source array 3 through the electro-optical conversion module 2. The radio frequency signals modulated into the optical domain enter the signal processing module 4, and then enter the analog signal processing units 4-1 respectively according to different functions to implement analog signal processing as shown in FIGS. 2A and 2B for pulse compression and spectrum detection, respectively, or enter the digital signal processing unit 4-2 to achieve digital signal processing as shown in FIG. 2C. Signals processed are converted into electrical signals by the photoelectric conversion module 5. On the one hand, the said signals are transmitted through the multi-function output unit 6 to realize signals emitting. On the other hand, the said signals can also be connected to the artificial intelligence chip 7-1. In addition, the signal processed by the signal processing module 4 can also connect to the artificial intelligence chip 7-1 directly. The signals connected to the artificial intelligence chip 7-1 can be used to train the deep learning networks 7-2 in the chip, and the artificial intelligence chip 7-1 realizes the intelligent signal processing unit through the constructed deep learning networks 7-2. The intelligent signal processing unit can control the reception and processing of signals, perform fast processing, determination and decision on the acquired signals, and control signal emission and information output.

Figure 3:
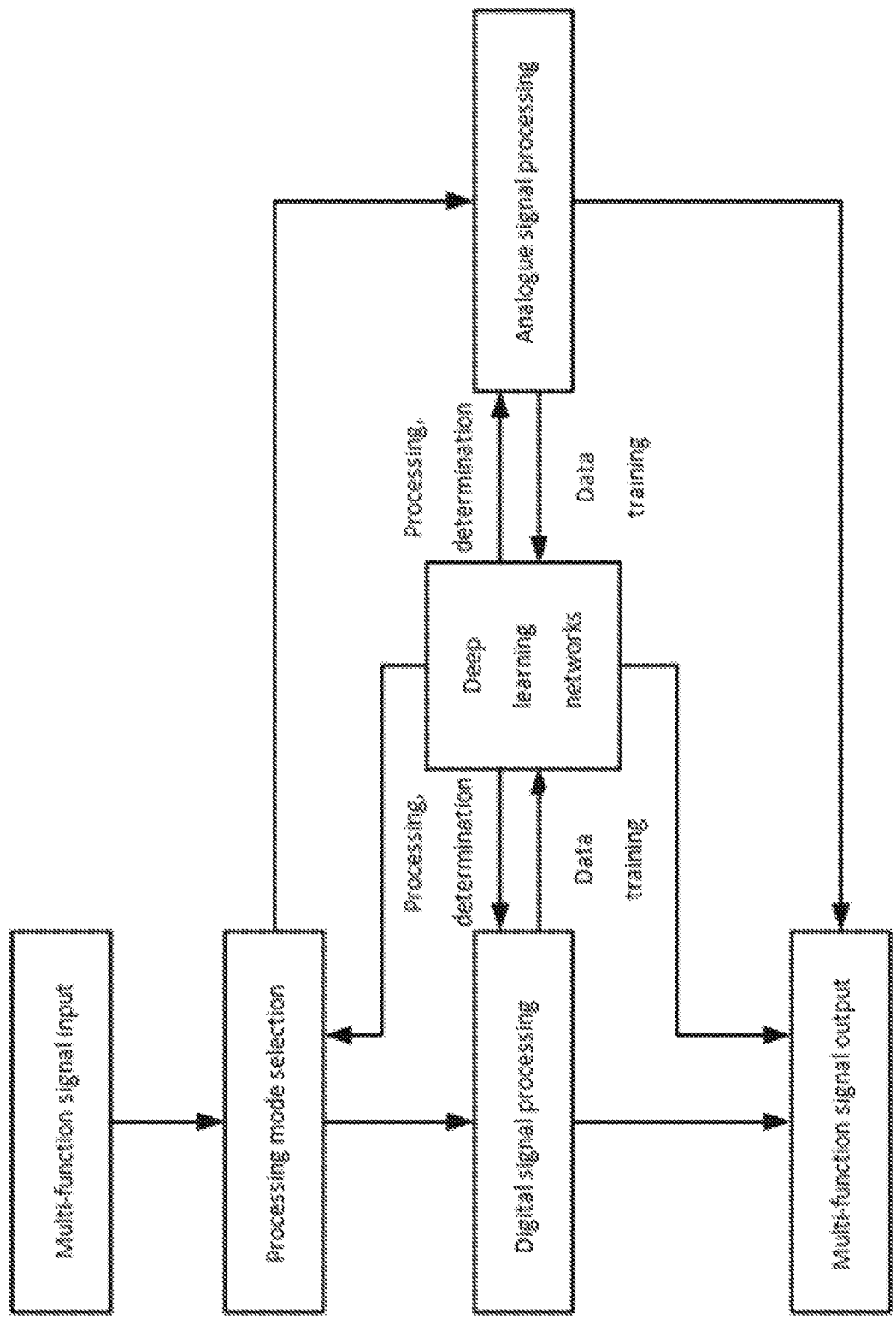
FIG. 3 shows a signal interaction flowchart of the present invention.

FIG. 3 shows a signal interaction flowchart of the present invention. The multi-function signal is input into the intelligent decision-making photonic signal processing system, according to different functions, the deep learning networks will control the processing mode selection to distribute the input multi-function signal for the analogue signal processing or digital signal processing. On the one hand, the deep learning networks control the signal processing and determination process of analogue signal processing or digital signal processing, on the other hand, the results of analogue signal processing or digital signal processing can be used as the training data of the deep learning networks. The final processing result of input multi-function signal is output from the analogue/digital signal processing or the deep learning networks to the multi-function signal output.

The above process based on the advantages of large bandwidth and high speed of photonic technology may realize efficient analog and digital signal processing. Combining with deep learning algorithms, the process enables real-time and efficient processing and decision-making of the acquired signals, thereby realizing an intelligent signal processing system. The present invention may be widely used in radar, electronic countermeasures, communications and other electronic information systems.

We claim:

1. An intelligent decision-making photonic signal processing system, comprising
   a multi-functional input unit, the multi-functional input unit comprising an array of output ports, wherein the multi-functional input unit receives multi-functional radio frequency signals and modulates the radio frequency signals to a continuous or pulsed optical carrier, an electro-optical conversion module, the electro-optical conversion module comprising an array of electro-optical modulators, each electro-optical modulator having a first input port, a second input port, a first output port, the first input ports of the array of electro-optical modulators form an array of first input ports of the electro-optical conversion module, the second input ports of the array of electro-optical modulators form an array of second input ports of the electro-optical conversion module, the first output ports of electro-optical modulators are divided into an array of first output ports and an array of second output ports of the electro-optical conversion module, wherein the electro-optical conversion module converts the modulated radio frequency signals to optical domain signals, light source arrays, the light source arrays having an array of output ports, wherein the light source arrays generates the continuous or pulsed optical carrier for the modulated radio frequency signals, a signal processing module, the signal processing module comprising multiple analog signal processing units and multiple digital signal processing units; the analog signal processing units are a collection of analog neural network modules, signal filtering modules, pulse compression modules, and spectrum detection modules; and each of the analog neural network modules, signal filtering modules, pulse compression modules, and spectrum detection modules realizes signal interaction via optical interconnects; and the digital signal processing units are a collection of digital neural network modules, analog-digital conversion modules, and digital communication modules, and each of the digital neural network modules, the analog-digital conversion modules, and the digital communication modules realizes signal interaction via optical interconnects, wherein the optical domain signals are processed by the analog signal processing units or the digital signal processing units to obtain processed signals, a photoelectric conversion module, the photoelectric conversion module comprising an array of photodetectors, each photodetector having a first input port, a first output port, the first input ports of photodetectors are divided into an array of first input ports and an array of second input ports of the photoelectric conversion module, the first output ports of the array of photodetectors form an array of first output ports of the photoelectric conversion module, wherein the photoelectric conversion module converts the processed signals into electrical signals and splits the electrical signals into two parts for output, a multi-functional output unit, the multi-functional output unit comprising an array of input ports, wherein the multi-functional output unit receives one part of the electrical signals from the photoelectric conversion module, and an artificial intelligence chip, wherein the artificial intelligence chip receives another part of the electrical signals from the photoelectric conversion module or processed signals directed from the signal processing units, wherein the electrical signals and the processed signals are used to train a deep learning network of the artificial intelligent chip so that the artificial intelligent chip becomes an intelligent signal processing unit through the constructed deep learning network and performs processing, determination and decision on the electrical signals and the processed signals and simultaneously controls signal transmission and information output via respective connection to the electro-optical conversion module, the light source arrays, the multiple analog signal processing units and the multiple digital signal processing units of the signal processing module, the photoelectric conversion module, and the multi-functional output unit, wherein the array of output ports of the multi-functional input unit is connected to the array of first input ports of the electro-optical conversion module;

the array of output ports of light source arrays is connected to the array of second input ports of the electro-optical conversion module;

the array of first output ports of electro-optical conversion module is connected to the array of first input ports of the photoelectric conversion module through the analog signal processing units;

the array of second output ports of electro-optical conversion module is connected to the array of second input ports of the photoelectric conversion module through the digital signal processing units;

the array of first output ports of photoelectric conversion module is connected to the array of input ports of the multi-functional output unit, and the artificial intelligence chip is respectively connected to the electro-optical conversion module, the light source arrays, the multiple analog signal processing units and the multiple digital signal processing units of the signal processing module, the photoelectric conversion module, and the multi-functional output unit.

2. The intelligent decision-making photonic signal processing system of claim 1, wherein the multi-functional input unit is a radio frequency receiving antenna or a digital communication receiver for receiving multifunctional radio frequency signals.

3. The intelligent decision-making photonic signal processing system of claim 1, wherein the multi-functional output unit is used to output processed signals, and the output processed signals from the multi-functional output unit are radio frequency signals, digital signals, or digital images.

4. The intelligent decision-making photonic signal processing system of claim 1, wherein the artificial intelligence chip is a tensor processing unit (TPU), a graphics processor unit (GPU), a photonic analog chip, or a digital chip, and
wherein the artificial intelligence chip trains and constructs a deep learning network and controls the electro-optical conversion module, the analog signal processing unit, the digital signal processing unit, the photoelectric conversion module, and the multi-function output unit to realize signal receiving and processing.

5. A method for intelligent decision-making photonic signal processing, using the intelligent decision-making photonic signal processing system of claim 1, comprising
(1) using the multi-function input unit to receive multi-functional radio frequency signals, and modulating the multi-functional radio frequency signals to a continuous or pulsed optical carrier generated by the light source arrays via the electro-optical conversion module, thereby completing conversion from the multi-functional radio frequency signals to optical domain signals;
(2) the optical domain signals entering the signal processing units and are distributed into the analog signal processing units or the digital signal processing units according to different functional requirements;

(3) converting the processed signals into electrical signals by the photoelectric conversion module, and splitting the electrical signals into a first part and a second part; outputting the first part of the electrical signals through the multi-function output unit, and inputting the second part of the electrical signals into the artificial intelligence chip for processing, determination, and decision-making; and optionally, processing the processed signals by directly entering and processing in the artificial intelligence chip without conversion and splitting; and (4) training and constructing a deep learning network in the artificial intelligent chip by the signals entering into the artificial intelligence chip, and at a same time, forming an intelligent signal processing unit through the constructed deep learning network in the artificial intelligence chip; controlling the electro-optical conversion module, the analog signal processing unit, the digital signal processing unit, the photoelectric conversion module, and the multi-function output unit via the intelligent signal processing unit to realize signal receiving and processing, wherein the intelligent signal processing unit performs processing, determination and decision on acquired signals, and simultaneously controls signal transmission and information output.

* * * * *